US005828950A

United States Patent [19]

Uchida

[11] Patent Number: 5,828,950

[45] Date of Patent: Oct. 27, 1998

[54] RECEIVING APPARATUS

[75] Inventor: Tetsuro Uchida, Kanagawa, Japan

[73] Assignee: Mitsumi Electric Co. Ltd., Tokyo, Japan

[21] Appl. No.: 681,356

[22] Filed: Jul. 23, 1996

[30] Foreign Application Priority Data

Jul. 28, 1995 [JP] Japan .................................... 7-212460

[51] Int. Cl.$^6$ ................................ H04B 1/00; H04B 7/00

[52] U.S. Cl. .................... 455/70; 455/181.1; 340/825.69

[58] Field of Search .................................... 455/352, 54.1, 455/54.2, 58.1, 181.1, 70, 66, 517, 527; 340/825.69, 825.72, 825.22, 825.24, 825.25, 825.52

[56] References Cited

U.S. PATENT DOCUMENTS 4,245,347 1/1981 Hutton et al. ............................ 455/70

*Primary Examiner*—Andrew I. Faile
*Assistant Examiner*—Christopher Onuaku
*Attorney, Agent, or Firm*—Whitham, Curtis & Whitham

[57] ABSTRACT

A receiving apparatus having an ID number memory unit to which any one of the different ID numbers of command signals received from a plurality of transmitters can be referred, wherein the signal received from one of the transmitters and temporarily stored in a buffer memory is compared one by one with ID numbers in the ID number memory unit before being fed into a central processing unit and wherein there is provided a timer T which is set when the received ID number has been identified by the ID number memory unit and used for inhibiting the next ID number from being referred thereto for a predetermined period of time.

19 Claims, 2 Drawing Sheets

RECEIVING APPARATUS

BACKGROUND OF THE INVENTION

1. Field of the Invention

The present invention relates to a receiving apparatus for use in, for example, a remote radio controlled crane and more particularly to a receiving apparatus which operates on signals having different ID numbers from a plurality of transmitters.

2. Related Art

As is well known, operating units in, for example, some of the remote radio controlled cranes may be actuated by a receiving apparatus J1 for receiving command signals from a plurality of transmitters $S_A$–$S_B$ each having different ID numbers.

FIG. 2 shows such a receiving apparatus J1 for receiving command signals from a plurality of transmitters $S_A$–$S_N$ each having different ID numbers in a radio controlled crane, wherein an output from a demodulator 21 for detecting and demodulating a signal from a reception antenna 11 is supplied to not only a buffer memory 31 but also a switching device 41 of an ID number memory unit 51; when the ID numbers involved are found coincident with each other in a comparator 61 for comparing the ID number stored in the buffer memory 31 with the output of the ID number memory unit 51, the contents of the signal received from any one of the transmitters $S_A$–$S_N$ and temporarily stored in the buffer memory 31 are sent to a central processing unit 71 and the designated one out of the operating unit drivers 81–83 is controlled by the central processing unit 71.

Incidentally, the transmitters $S_A$–$S_N$ under the control of a plurality of operators each incorporate input devices 91 capable of giving a command to each operating unit as a crane operating element and ID memories $\mathbf{10}_A$–$\mathbf{10}_B$ for storing ID numbers different from one another. The contents of the commands issued by these input devices 91 and the ID numbers are demodulated by modulators 111 before being transmitted from transmission antennas 121, respectively.

With the conventional receiving apparatus thus configured, however, the receiving apparatus J1 can sometimes accept the contents of the first command from one of the transmitters $S_A$–$S_N$ when commands as to actuating the operating units are substantially simultaneously issued from the plurality of transmitters $S_A$–$S_N$ and then accept the contents of a command from another one of the transmitters $S_A$–$S_N$ immediately after the contents of the first command have been processed by the central processing unit 71. Therefore, the operator who has dealt with the first command from one of the transmitters $S_A$–$S_N$ may be confused at the unexpected reaction of the operating unit.

In other words, assuming that while a specific operating unit is kept under control in accordance with the contents of the command issued as a result of the fact that the transmitter $S_A$, for example, is operated by a operator A first, another transmitter $S_N$ is operated by a operator N, the receiving apparatus J1 will start executing the contents of the command from the transmitter $S_N$ immediately after the contents of the command from the preceding transmitter $S_A$ have been processed, so that the operator A may be confused to look at the unexpected operation of the operating unit.

SUMMARY OF THE INVENTION

In view of the foregoing problems with the conventional receiving apparatus, an object of the present invention is to provide a receiving apparatus without the fear of making an operator who operates a transmitter become confused even though command signals are substantially simultaneously issued from a plurality of transmitters.

In order to accomplish the object above, a receiving apparatus according to the present invention is provided with an ID number memory unit to which any one of the different ID numbers of command signals received from a plurality of transmitters can be referred, wherein the signal received from one of the transmitters and temporarily stored in a buffer memory is compared one by one with ID numbers in the ID number memory unit before being fed into a central processing unit and wherein there is provided a timer which is set when the received ID number has been identified by the ID number memory unit and used for inhibiting the next ID number from being referred to for a predetermined period of time.

DETAILED DESCRIPTION OF THE PREFERRED EMBODIMENTS

Figure 1:
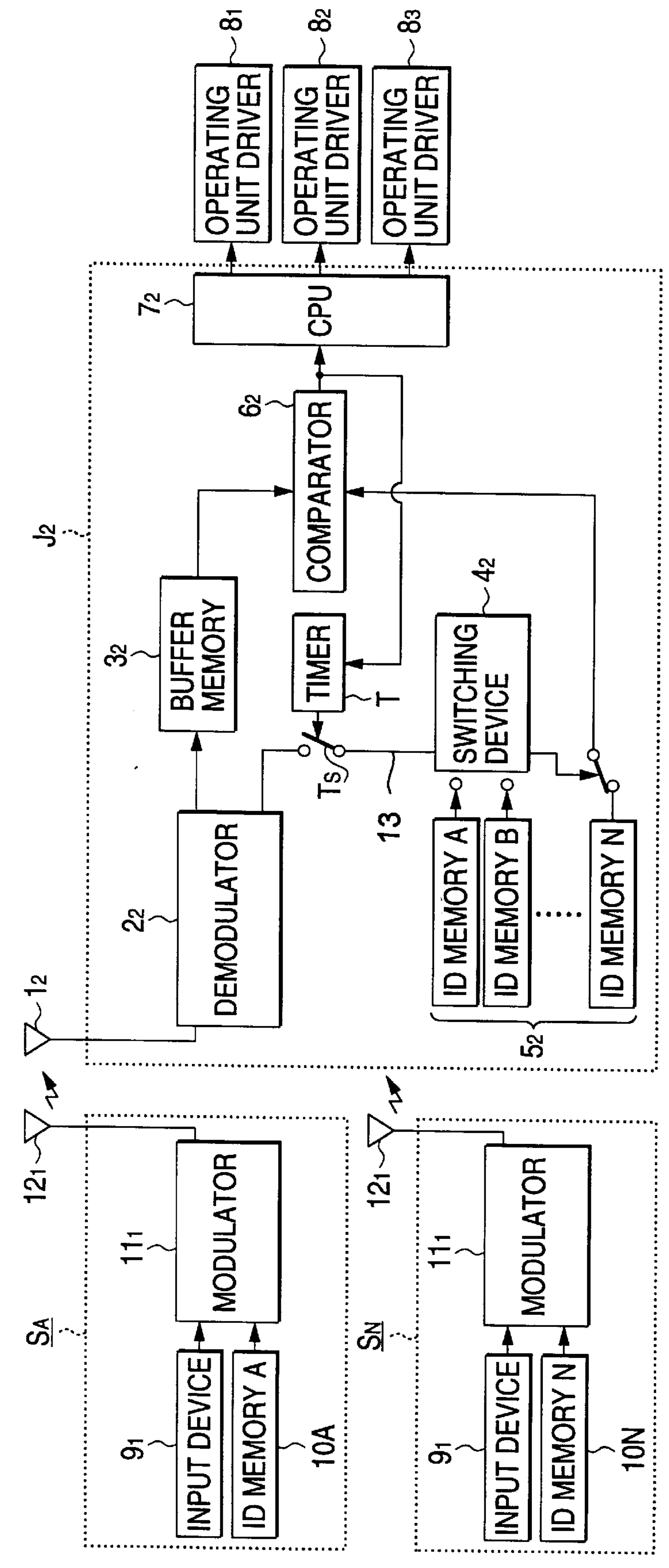
FIG. 1 is a block diagram of a receiving apparatus J2 according to the present invention.

Referring to FIG. 1, there is shown a receiving apparatus embodying the present invention.

Figure 2:
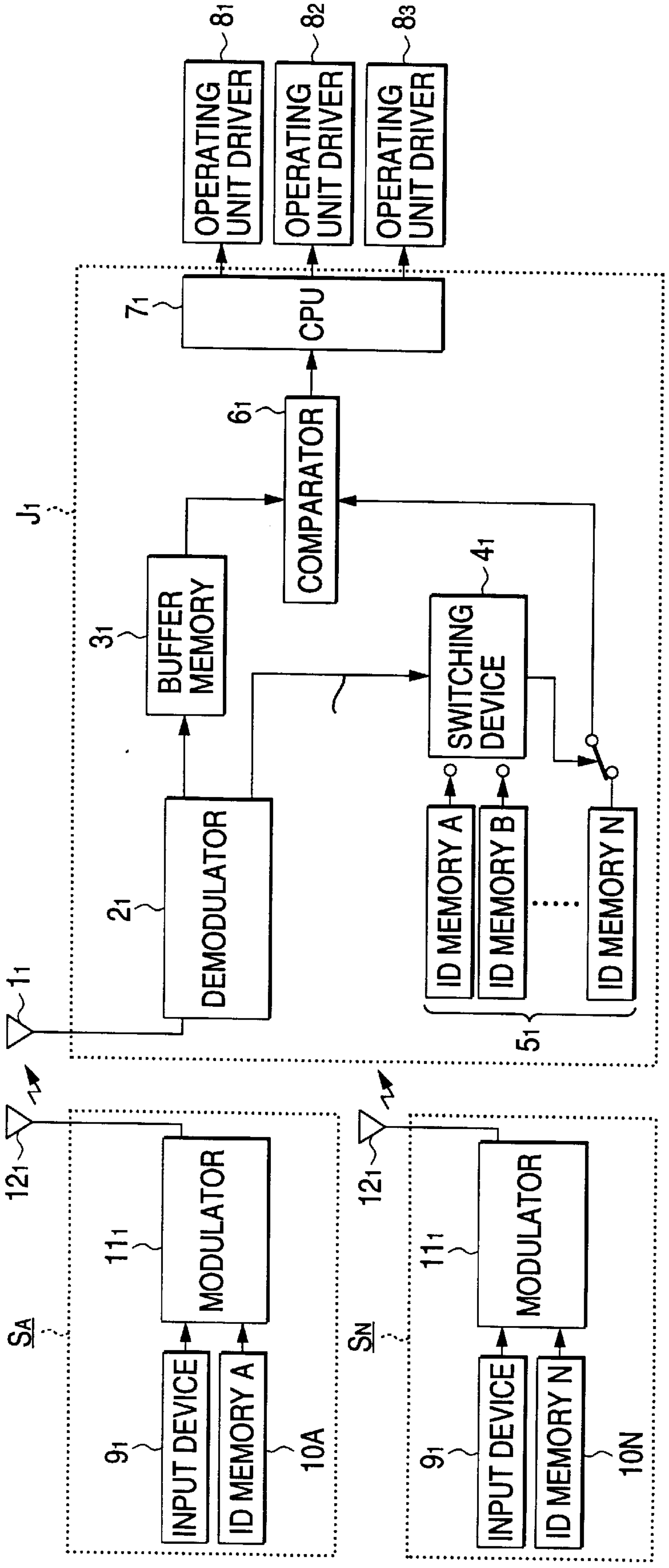
FIG. 2 PRIOR ART
FIG. 2 is a block diagram of a convention receiving apparatus J2.

FIG. 1 is a block diagram of a receiving apparatus J2 equivalent to what is shown in FIG. 2. A plurality of transmitters $S_A$–$S_N$ which are used together with the receiving apparatus J2 and each incorporate input devices 92 capable of issuing commands to operating units as crane operating elements and ID memories $\mathbf{10}_A$–$\mathbf{10}_B$ for storing ID numbers different from one another. The contents of the commands from the input devices 92 and the ID numbers are modulated by modulators 112 before being transmitted from respective transmission antennas 122.

The receiving apparatus J2 is provided with a demodulator 22 for detecting and demodulating a signal from a reception antenna 12 and the output of the demodulator 22 is temporarily stored in a buffer memory 32 and simultaneously supplied to a switching device 42 of an ID number memory unit 52 in order to check whether the ID number received has been placed on the catalog similarly as in the prior art.

Further, the ID number read from the ID number memory unit 52 is compared by a comparator 62 successively with the ID numbers stored in the buffer memory 32 and when both the ID numbers are found coincident with each other, the contents of the storage command of the buffer memory 32 are fed to a central processing unit 72. Then a command is issued to any one of the operating unit drivers 81–83 supported by the transmitters $S_A$–$S_N$, so that the operating unit thus designated is actuated.

In the receiving apparatus J2 of FIG. 1 according to this embodiment of the invention, the output signal of the comparator 62 is supplied to a timer T incorporating a contact portion $T_S$ with a conductor 13 extending from the demodulator 22 up to the switching device 42. In other words, the timer T cuts off the contact portion $T_S$ for a predetermined period of time in accordance with the output of the comparator 62, whereby the next ID number is inhibited from being received for the predetermined period of time after the command signal is received from one of the transmitters $S_A$–$S_N$.

Since the receiving apparatus J2 of FIG. 1 according to this embodiment of the invention is thus configured, it accepts the contents of the first command transmitted from the plurality of transmitters $S_A$–$S_N$. In other words, the output of the demodulator 22 is temporarily stored in the buffer memory 32 and the comparator 62 determines whether or not the ID number contained in that output signal is found in the ID number memory unit 52. When both the ID numbers are found coincidental with each other, the contents of the command given by the buffer memory 32 is sent to the central processing unit 72, which actuates the corresponding operating unit driver in accordance with the result of the process performed thereby.

The output of the comparator 62 causes the timer T to be set simultaneously with the operation of the operating unit and the contact portion $T_S$ of the timer T is cut off for the predetermined period of time. Therefore, the next ID number cannot be referred to until the contents of the command received first from one of the transmitters $S_A$–$S_N$ are completely executed and the operator who has operated the first one of the transmitters $S_A$–$S_N$ is prevented from becoming confused because he is allowed to control the operating unit in charge until the result of operation he has intended to obtain is fully attained.

As set forth above, according to the present invention, the next ID number is inhibited from being referred to until the contents of the command received first from one of the transmitters are completely processed, which has the effect of preventing the operator operating the operating unit from becoming confused.

What is claimed is:

1. A receiving apparatus for receiving a plurality of command signals from a plurality of transmitters, said command signals including received ID numbers, said received ID numbers each being uniquely associated with a corresponding one of said transmitters, said apparatus comprising:

an ID number memory unit for storing a plurality of stored ID numbers;

a buffer memory, operatively connected to said ID memory unit, for temporarily storing a command signal of said command signals received from one of the transmitters;

a comparator, connected to said ID number memory unit and said buffer memory, for comparing a received ID number of said received ID numbers received from said transmitter with said stored ID numbers in said ID number memory unit and outputting a match signal when one of said stored ID numbers matches said received ID number;

a central processing unit connected to said buffer memory, wherein said command signal is sent from said buffer memory to said central processing unit when said comparator outputs said match signal; and a timer, connected to said ID number memory unit, for inhibiting said comparator from referring to said ID number memory unit for a predetermined period of time when said match signal is output from said comparator, wherein said predetermined period of time is greater than a time for executing said command signal.

2. A method for receiving command signals from transmitters, said command signals including received ID numbers, said received ID numbers each being uniquely associated with a corresponding one of said transmitters, said method comprising steps of:

receiving said command signals from said plurality of transmitters;

temporality storing a command signal received from one of the transmitters in a buffer memory;

comparing a received ID number of said received ID numbers in the command signal with stored ID numbers stored in an ID number memory unit;

feeding said command signal to a central processing unit when said received ID number in said command signal matches one of said stored ID numbers in said ID number memory unit;

setting a timer when said received ID number in said command signal matches one of said stored ID numbers in said ID number memory unit; and inhibiting said ID number memory unit from being referred to for a predetermined period of time when said received ID number in said command signal matches one of said stored ID numbers in said ID number memory unit, wherein said predetermined period of time is greater than a time for executing said command signal.

3. The receiving apparatus as in claim 1, further comprising an antenna connected to said buffer memory for receiving said command signal.

4. The receiving apparatus as in claim 3, further comprising a demodulator connected to said antenna for demodulating said command signal.

5. The receiving apparatus as in claim 1, wherein said central processing unit is for controlling a plurality of operational units and said predetermined time period is greater than a time period for one of said operational units to perform an operation associated with said command signal.

6. The receiving apparatus as in claim 5, wherein said operational units comprise heavy equipment.

7. The method as in claim 2, wherein said receiving step includes receiving said command signal with an antenna.

8. The method as in claim 7, further comprising a step of demodulating said command signal.

9. The method as in claim 2, further comprising a step of controlling a plurality of operational units with said central processing unit, wherein said predetermined time period is greater than a time period for one of said operational units to perform an operation associated with said command signal.

10. The method as in claim 9, wherein said operational units comprise heavy equipment.

11. An apparatus for receiving signals from a plurality of transmitters, each of said plurality of transmitters having one of a plurality of unique identification numbers, said apparatus comprising:

a receiver for receiving first signals of said signals from a first transmitter of said plurality of transmitters, said receiver including an antenna and a demodulator connected to said antenna;

a timer, operatively connected to said receiver;

a memory, operatively connected to said demodulator, said memory having valid identification numbers; and a comparator connected to said memory and said demodulator, for comparing said unique identification numbers with said valid identification numbers;

said receiver accepting said first signals during a predetermined period of time after receipt of said first signals, said receiver ignoring second signals of said signals from second transmitters of said plurality of transmitters during said period of time, and said receiver accepting said first signals and said second signals after said predetermined period of time, said timer disconnecting said memory from said comparator during said predetermined time period after said comparator verifies a first identification number of said unique identification numbers, said first identification number identifying said first transmitter, such that only said first signals are accepted during said predetermined time period, said predetermined time being greater than a time for executing an operation associated with said first signals.

12. The apparatus in claim 11, further comprising a central processing unit, connected to said comparator, for controlling a plurality of operational units, said predetermined time period being greater than a time period for one of said operational units to perform an operation associated with said first signals.

13. The apparatus in claim 12, wherein said operational units comprise heavy equipment.

14. The receiving apparatus in claim 1, wherein said received ID number corresponds to a first transmitter of said transmitters, said comparator accepting signals from said first transmitter during said predetermine period of time and ignoring signals from second transmitters of said transmitters during said predetermined period of time, said comparator accepting signals from said first transmitter and said second transmitters after said predetermined period of time.

15. The receiving apparatus in claim 1, wherein said timer resets said predetermined period of time upon receipt of each of said command signals.

16. The receiving apparatus in claim 1, wherein said timer causes a first transmitter of said transmitters to have exclusive control of said receiving apparatus for said predetermined period of time.

17. The method in claim 2, wherein said received ID number corresponds to a first transmitter of said transmitters, said method further comprising steps of:

accepting signals from said first transmitter during said predetermined period of time;

ignoring signals from second transmitters of said transmitters during said predetermined period of time; and accepting signals from said first transmitter and said second transmitters after said predetermined period of time.

18. The method in claim 2, further comprising a step of resetting said predetermined period of time upon receipt of each of said command signals.

19. The method in claim 2, wherein said inhibiting step causes a first transmitter of said transmitters to have exclusive control of said receiving apparatus for said predetermined period of time.

* * * * *